(12) United States Patent
Oyasato

(10) Patent No.: US 9,547,585 B2
(45) Date of Patent: Jan. 17, 2017

(54) INFORMATION PROCESSING DEVICE, MEMORY MANAGEMENT METHOD, AND RECORDING MEDIUM THAT ENSURE VERSATILE MEMORY MANAGEMENT

(71) Applicant: Kyocera Document Solutions Inc., Osaka (JP)

(72) Inventor: Tomoki Oyasato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 3 days.

(21) Appl. No.: 14/670,409

(22) Filed: Mar. 27, 2015

(65) Prior Publication Data

US 2015/0278082 A1 Oct. 1, 2015

(30) Foreign Application Priority Data

Mar. 27, 2014 (JP) ................. 2014-065051

(51) Int. Cl.
*G06F 12/00* (2006.01)
*G06F 12/02* (2006.01)

(52) U.S. Cl.
CPC ..... *G06F 12/023* (2013.01); *G06F 2212/1044* (2013.01)

(58) Field of Classification Search
CPC . G06F 12/00; G06F 12/023; G06F 2212/1044
USPC .................. 711/100, 154, 170, 171, 172
See application file for complete search history.

(56) References Cited

U.S. PATENT DOCUMENTS

| 5,781,598 A * | 7/1998 | Hardy, III | H04L 25/14 370/465 |
| 6,512,988 B1 * | 1/2003 | Kanago | G06F 11/2733 702/123 |
| 6,820,177 B2 * | 11/2004 | Poisner | G06F 12/1458 710/200 |
| 8,984,179 B1 * | 3/2015 | Cardona | G06F 13/28 710/1 |

FOREIGN PATENT DOCUMENTS

JP H05-324431 A 12/1993

* cited by examiner

*Primary Examiner* — Tuan Thai
(74) *Attorney, Agent, or Firm* — James Judge

(57) ABSTRACT

An information processing device includes a memory and a control unit. The memory is employed as a program work area. The control unit switches between a first mode and a second mode; during the first mode, detects a resident program resident in the memory, and saves information identifying the resident program, as resident program information; and during the second mode, determines whether a requestor program, requesting allocation of the work area, is the resident program or not by comparing requestor-program identifying information with the resident program information, and in succession allocates in the memory respective work areas for one or more requestor programs determined to be resident programs.

6 Claims, 4 Drawing Sheets

INFORMATION PROCESSING DEVICE, MEMORY MANAGEMENT METHOD, AND RECORDING MEDIUM THAT ENSURE VERSATILE MEMORY MANAGEMENT

INCORPORATION BY REFERENCE

This application is based upon, and claims the benefit of priority from, corresponding Japanese Patent Application No. 2014-065051 filed in the Japan Patent Office on Mar. 27, 2014, the entire contents of which is incorporated herein by reference.

BACKGROUND

Unless otherwise indicated herein, the description in this section is not prior art to the claims in this application and is not admitted to be prior art by inclusion in this section.

Conventionally, there has been a need for an efficient memory management method. For example, for minimizing fragmentation of a free memory, a known database processing unit classifies data to be stored in a memory into two types of actual processing data and a parameter required for that process.

Additionally, the database processing unit arranges the one data from a high-level address and the other data from a low-level address so as to prevent these data from being mixed in the memory. Thus, separating a memory area for data, which have different properties (such as a time period for being allocated) in the memory, reduces memory fragmentation.

SUMMARY

An information processing device according to one aspect of the disclosure includes a memory and a control unit. The memory is employed as a program work area. The control unit switches between a first mode and a second mode; during the first mode, detects a resident program resident in the memory, and saves information identifying the resident program, as resident program information; and during the second mode, determines whether a requestor program, requesting allocation of the work area, is the resident program or not by comparing requestor-program identifying information with the resident program information, and in succession allocates in the memory respective work areas for one or more requestor programs determined to be resident programs.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
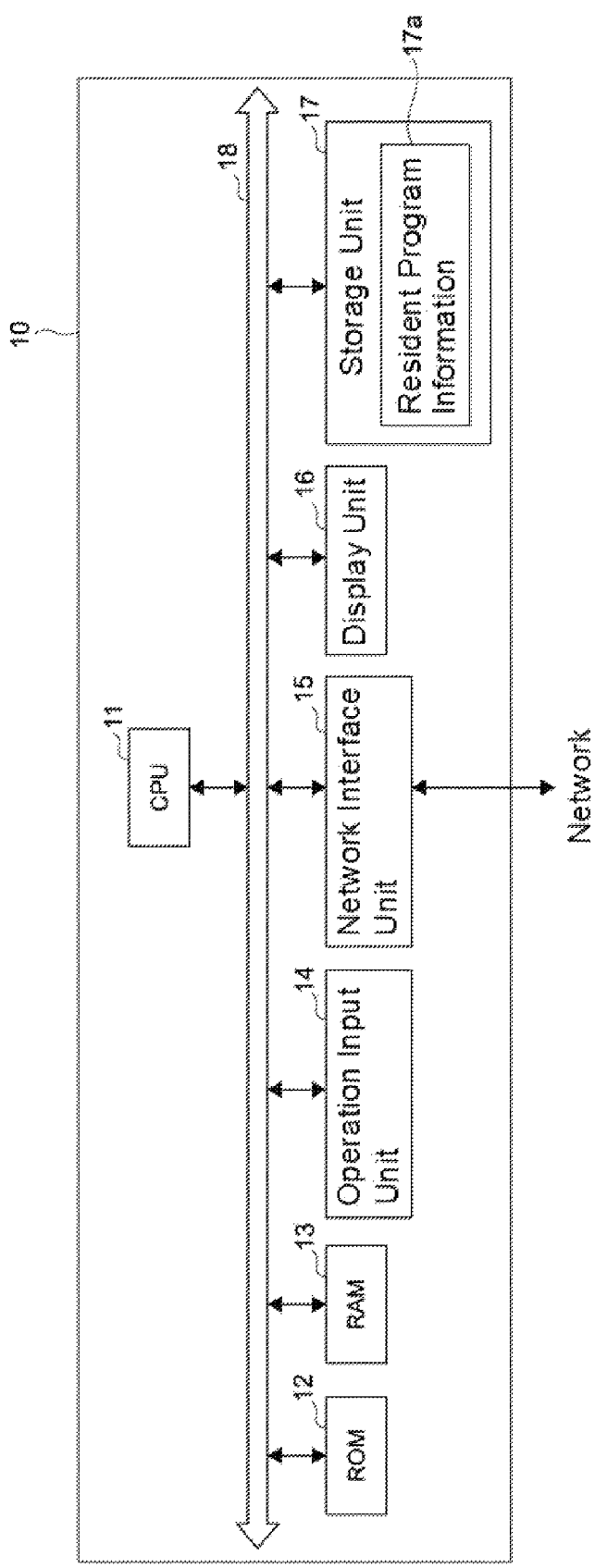
FIG. 1 illustrates a function block configuration of an information processing device.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings.
Outline First, an outline of the embodiment will be described. The embodiment assumes that an information processing device is mostly a typical computer, especially a personal computer (PC).

The information processing device according to the embodiment classifies a program to be executed in the information processing device into two types of a resident program and a non-resident program. Subsequently, for each type, the information processing device separates locations for allocating a work area requested by the program in the memory. Thus, memory fragmentation is reduced.

For the resident program, the work area allocated in the memory is used for extended periods of time from activation to termination of the information processing device. By contrast, for the non-resident program, the work area allocated in the memory is used only in a short time while the program is explicitly activated and to be terminated by a user.

That is, the resident program and the non-resident program differ in time taken of which the work area allocated in the memory is used in a long time or in a short time. The embodiment focuses on this difference to allocate the work areas in different areas in the memory for the resident program and the non-resident program. This ensures reducing the fragmentation due to the sandwiched work area to be released in a short time between the work areas used in a long time.

The embodiment assumes that the non-resident program releases the work area allocated in the memory to be used when such as the users terminate the program.

The information processing device of the embodiment firstly detects the resident program in a detection mode of the resident program (a first mode) and creates a list of the resident programs (resident program information). Subsequently, after completing the detection mode of the resident program, the information processing device is changed to a normal mode (a second mode).

In the normal mode, the information processing device separates the work area allocated in the memory by the resident program and the work area allocated in the memory by the non-resident program in accordance with the created list. Accordingly, while reducing the fragmentation of the work area in the memory, the information processing device executes the various programs. As a result, the information processing device ensures a versatile memory management.

Shifting from the detection mode of the resident program to the normal mode may be performed by rebooting the information processing device after changing a mode setting of the information processing device by the explicit instruction from the user.

Up to this point, the outline of the embodiment has been described.

Resident Program

The resident program will now be described.

The resident program is the program being executed whenever the information processing device operates. The resident program is automatically activated without the user explicitly instructing to activate.

For example, any personal computer (PC) on which Windows (Registered trademark) operates as an Operating System (OS) display icons for some resident programs in a task tray displayed as a part of a Graphical User Interface (GUI) of a display screen.

An example of the resident program includes antivirus software, a messenger for exchanging messages via a network, or similar software.

Up to this point, the resident program has been described.

Detection Method of Resident Program

Some examples related to the detection method of the resident program performed by the information processing device of the embodiment will now be described.

Method 1

Method 1 determines it from a fluctuation rate of a CPU load. Method 1 activates and then leaves the information processing device as it is without the user's explicitly instructing to activate the program. Method 1 monitors the fluctuation rate of the CPU load of the programs running for a certain period. Method 1 determines that an operating condition of the information processing device has been stable if it has been observed that the fluctuation rate for that period has kept a predetermined value or less. Consequently, method 1 determines that the program operating at that time is the resident program.

Method 2

Method 2 determines from the CPU load. Method 2 activates and then leaves the information processing device as it is without the user's explicitly instructing to activate the program. Method 2 monitors the CPU load of the programs running for a certain period. Method 2 determines that an operating condition of the information processing device has been stable if it has been observed that the load for that period has kept a predetermined value or less. Consequently, method 2 determines that the program operating at that time is the resident program.

Method 3

Method 3 determines from settings of the OS of the information processing device. Method 3 obtains a list of the programs being set so as to be automatically activated during activation of the information processing device from an auto-start setting file of the OS.

Up to this point, some examples related to the detection method of the resident program performed by the information processing device of the embodiment have been described.

Configuration of Information Processing Device 10

A configuration of an information processing device 10 will now be described. FIG. 1 illustrates the function block configuration of the information processing device 10.

As illustrated in FIG. 1, the information processing device 10 includes a Central Processing Unit (CPU) 11 (control unit), a Read Only Memory (ROM) 12, a Random Access Memory (RAM) 13 (memory), an operation input unit 14, a network interface unit 15, a display unit 16, and a storage unit 17. These blocks are each connected via a bus 18. Unless otherwise noted, the word "memory" mentioned in the description of the embodiment refers to the RAM 13.

The ROM 12 permanently stores a plurality of programs such as a firmware and data for performing the various processes. The RAM 13, which is used as a working area of the CPU 11, temporarily holds the Operating System (OS), the various applications running on, and the various data during processing.

The storage unit 17 is such as a Hard Disk Drive (HDD), a flash memory, or an additional non-volatile memory. The storage unit 17 stores resident program information 17a, which will be described later, in addition to the OS, the various applications, and the various data.

The network interface unit 15 is connected to the network for exchanging information with other systems, and mainly communicates the information with the other systems.

The CPU 11 loads the program, which corresponds to an instruction provided by the operation input unit 14 among the plurality of programs stored in the ROM 12 and the storage unit 17, into the RAM 13. Subsequently, the CPU 11 appropriately controls the display unit 16 and the storage unit 17 in accordance with this loaded program.

When the information processing device 10 is under the detection mode of the resident program, the CPU 11 detects the resident program. And then, the CPU 11 defines the detection result as an identifier list of the resident program to store in the storage unit 17 as the resident program information. The identifier as described in here refers to a program name, a program ID, or a similar item.

The operation input unit 14 is such as a pointing device including a computer mouse, a keyboard, a touch panel, or an additional operating device.

The display unit 16 is such as a liquid crystal display, an Electro-Luminescence (EL) display, a plasma display, a Cathode Ray Tube (CRT) display, or a similar display. The display unit 16 may be contained in the information processing device 10 or may be connected externally.

Up to this point, the configuration of the information processing device 10 has been described.

Separation Method of Work Area in RAM 13

A method for separating the work area, which is allocated in the RAM 13 upon the program request of a work area allocation, for the resident program and the non-resident program will now be briefly described.

The work area as described in the embodiment refers to an area where such as an instruction code required for executing the program and the data required for the processes are loaded.

In the disclosure, the work area in the RAM 13 may be separated using any suitable method. Meanwhile, in the embodiment, the separation method of the work area with applying known techniques will be described.

Figure 2:
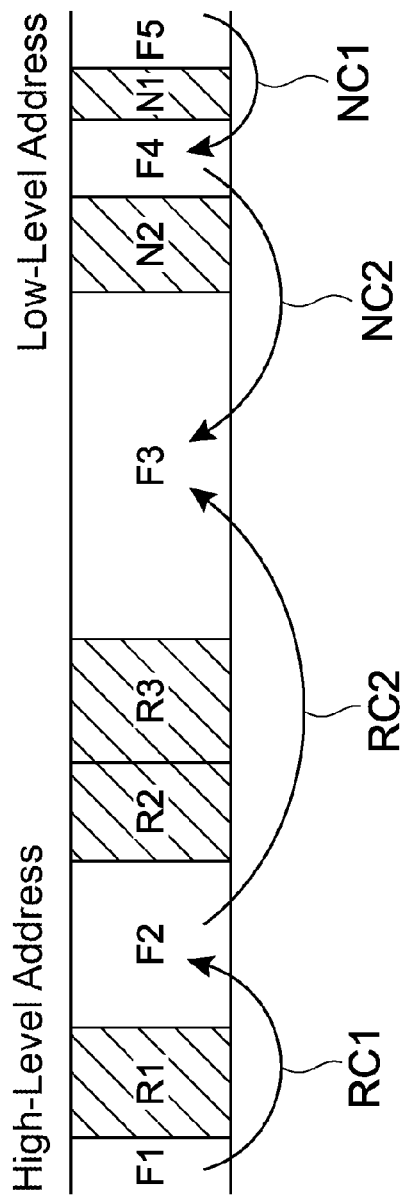
FIG. 2 illustrates a state where a work area is arranged in a RAM while broadly separated into a high-level address side and a low-level address side with a classification based on belonging to a resident program (R1, R2, R3) and a non-resident program (N1, N2).

FIG. 2 illustrates a state where the work area is arranged in the RAM 13 while broadly separated into a high-level address side and a low-level address side with the classification based on belonging to the resident program (R1, R2, R3) and the non-resident program (N1, N2).

In FIG. 2, the work areas R1, R2, and R3 for the resident program are arranged from the highest-level address (start point at one side) of memory addresses of the RAM 13. The work areas N1 and N2 for the non-resident program are arranged from the lowest-level address (start point at opposite side) of the memory addresses.

Additionally, free spaces F1, F2, F3, F4, and F5, which are not allocated as the work area, are arranged. The positions of those free spaces are represented by chained free spaces RC1 and RC2, which indicate a free space position in this order from the high-level address, and chained free space NC1 and NC2, which indicate the free space position in this order from the low-level address.

The free space F3 is located between the work area allocated from the high-level address and the work area allocated from the low-level address. The free space F3 is in the position that is denoted by the chained free spaces of both RC2 and NC2.

Figure 3:
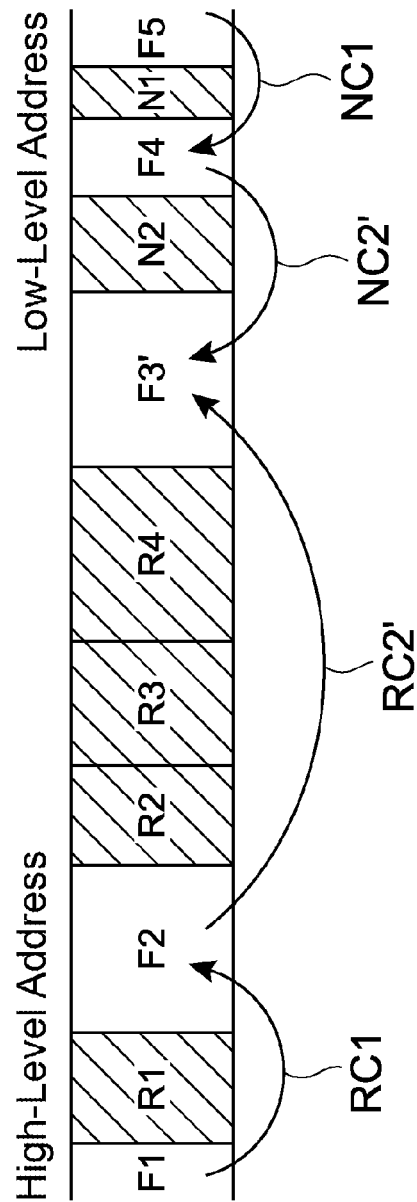
FIG. 3 illustrates a state where a work area R4 for a resident program is further allocated from the state of FIG. 2.

FIG. 3 illustrates a state where a work area R4 for the resident program is further allocated from the state of FIG. 2.

In FIG. 3, the work area R4 for the resident program is allocated in the high-level address side of the free space F3 as illustrated in FIG. 2. Then, instead of the chained free spaces RC2 and NC2 denoting the free space F3, chained free spaces RC2' and NC2' denote a new free space F3'.

As described above, when separating the RAM 13 into two types to use, allocating the work area successively from both sides (the highest-level address and the lowest-level address) of the address of the RAM 13 ensures efficient use of the RAM 13 area.

However, it is not limited to the above, and separating the RAM 13 into three or more types to use may also be applicable. The case of separating into three or more types includes such as the case where a time period of the work area to be used is separated into three or more types depending on a length of the time period instead of separating into two types for the resident program and the non-resident program.

Up to this point, the method for separating the work area, which is allocated in the RAM 13 upon the program request of the work area allocation, for the resident program and the non-resident program has been described.

Flow of Processes

A flow of the processes in the information processing device 10 according to the embodiment will now be described. The detection mode of the resident program and the normal mode will be described separately.

Figure 4:
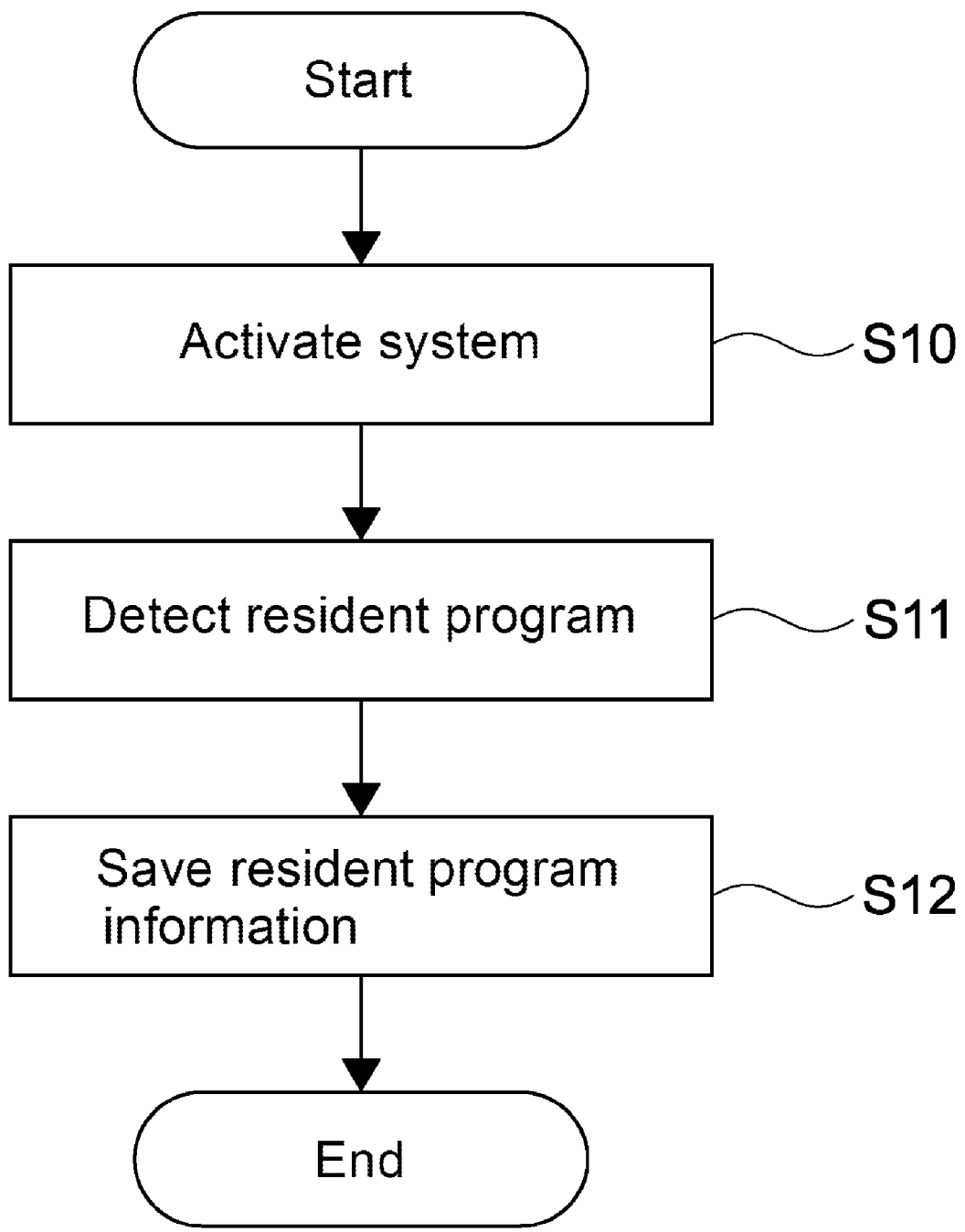
FIG. 4 illustrates a flowchart of processes in a detection mode of the resident program.

First, the description for the flow of the processes in the detection mode of the resident program will be provided. FIG. 4 illustrates the flowchart of the processes in the detection mode of the resident program.

First, the information processing device 10 is activated in the detection mode of the resident program (Step S10). The activation may be performed by the user's instruction, or automatically performed by such as a timer.

Next, the CPU 11 performs a detection of the resident program after the information processing device 10 becomes in a stable state. Subsequently, the CPU 11 obtains all the detected identification information of the resident program as the resident program information 17a (Step S11). The detection method of the resident program is as described above.

Lastly, the CPU 11 saves the resident program information 17a obtained in the previous step into the storage unit 17 (Step S12).

Up to this point, the flow of the processes in the detection mode of the resident program has been described.

Figure 5:
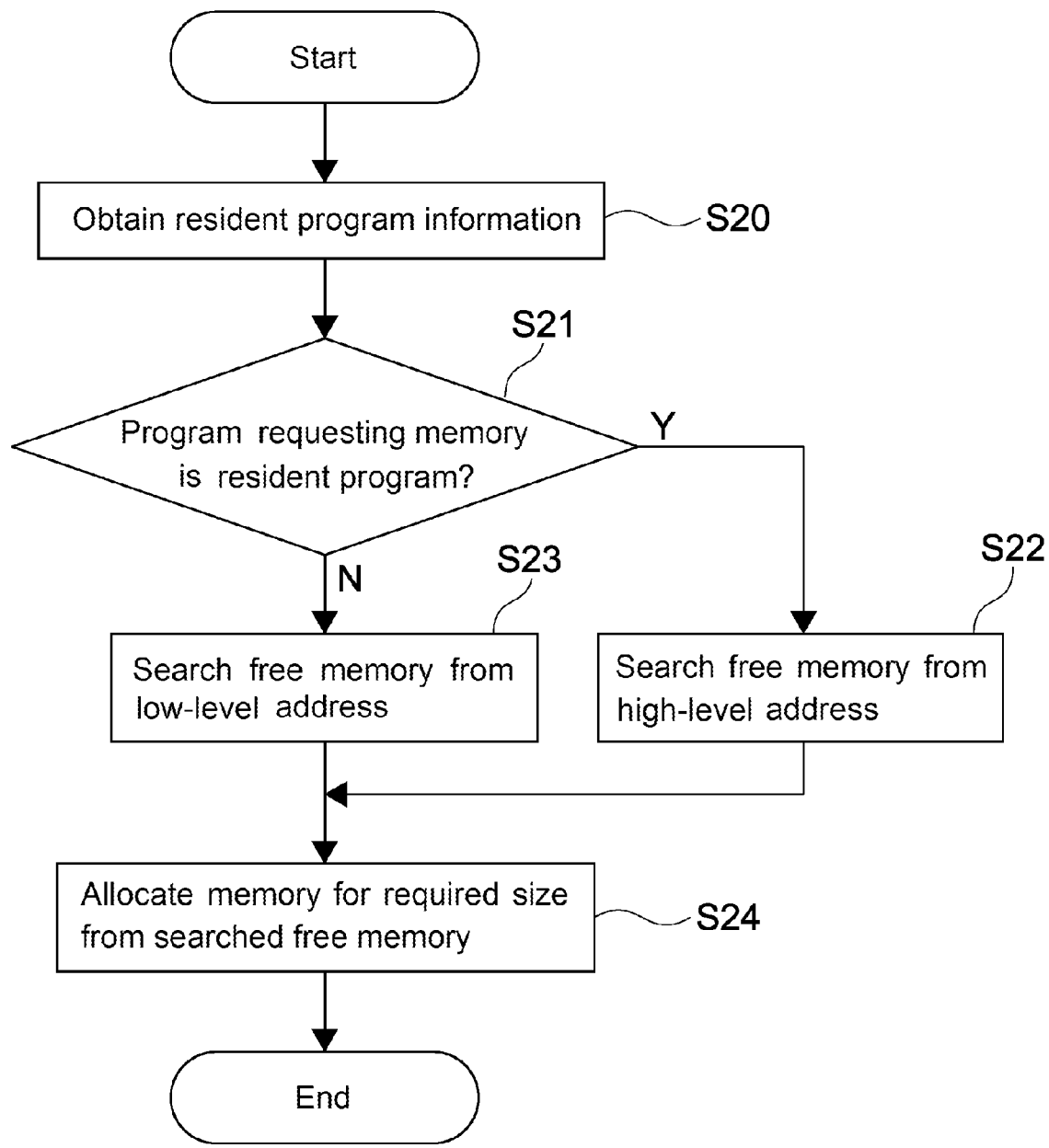
FIG. 5 illustrates a flowchart of processes in a normal mode.

Next, the description for the flow of the processes in the normal mode will be provided. FIG. 5 illustrates the flowchart of the processes in the normal mode.

First, the CPU 11 obtains the resident program information 17a from the storage unit 17 (Step S20).

Secondly, assume that a program requests the work area.

Subsequently, the CPU 11 determines whether the program of a requestor requesting the work area is the resident program or not by comparing the resident program information 17a with the requestor-program identifying information (Step S21).

If the program of the requestor is the resident program (Yes at Step S21), the CPU 11 searches the free space (free memory) while tracing the chained free spaces RC1 and RC2 from the highest-level address of a memory space (Step S22).

If the program of the requestor is not the resident program (No at Step S21), the CPU 11 searches the free space (free memory) while tracing the chained free spaces NC1 and NC2 from the lowest-level address of the memory space (Step S23).

Lastly, the CPU 11 allocates the work area having the required size in the free space obtained as search results (Step S24).

Up to this point, the flow of the processes in the normal mode has been described.

The description for the flow of the processes in the information processing device 10 according to the embodiment has been provided.

Note

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information processing device, comprising:
a memory employed as a program work area; and
a control unit; wherein
the control unit
switches between a first mode and a second mode,
during the first mode, detects a resident program resident in the memory, and saves information identifying the resident program, as resident program information,
during the second mode, determines whether a requestor program, requesting allocation of the work area, is the resident program or not by comparing requestor-program identifying information with the resident program information, and in succession allocates in the memory respective work areas for one or more requestor programs determined to be resident programs,
starts the allocation of work areas for the resident programs with one of either a highest-level address and a lowest-level address of the memory as a starting point, and
starts the allocation of work areas for other than resident programs with, as a starting point, an opposite side of the memory from said starting point being one of either the highest-level address and the lowest-level address.

2. The information processing device according to claim 1, wherein the control unit further, in the first mode, after the information processing device has been activated, detects, as the resident program, a program that, without the program having been launched by explicit instructions from a user, for a specified period has been running in a state in which a control-unit load fluctuation rate is at or below a predetermined value.

3. The information processing device according to claim 1, wherein the control unit further, in the first mode, after the information processing device has been activated, detects, as the resident program, a program that, without the program having been launched by explicit instructions from a user, for a specified period has been running in a state in which load on the control unit is at or below a predetermined value.

4. The information processing device according to claim 1, wherein the control unit further, in the first mode, detects the resident program based on a set file for automatically launching a resident program.

5. A memory management method managing a memory employed as a program work area, the method comprising:
   switching between a first mode and a second mode;
   during the first mode, detecting a resident program resident in the memory, and saving information identifying the resident program, as resident program information;
   during the second mode, determining whether a requestor program, requesting allocation of the work area, is the resident program or not by comparing requestor-program identifying information with the resident program information, and in succession allocating in the memory respective work areas for one or more requestor programs determined to be resident programs;
   starting the allocation of work areas for the resident programs with one of either a highest-level address and a lowest-level address of the memory as a starting point; and
   starting the allocation of work areas for other than resident programs with, as a starting point, an opposite side of the memory from said starting point being one of either the highest-level address and the lowest-level address.

6. A non-transitory computer-readable recording medium storing an information processing program for controlling an information processing device managing a memory employed as a program work area, the information processing program causing the information processing device to:
   switch between a first mode and a second mode;
   during the first mode, detect a resident program resident in the memory, and save information identifying the resident program, as resident program information;
   during the second mode, determine whether a requestor program, requesting allocation of the work area, is the resident program or not by comparing requestor-program identifying information with the resident program information, and in succession allocate in the memory respective work areas for one or more requestor programs determined to be resident programs;
   start the allocation of work areas for the resident programs with one of either a highest-level address and a lowest-level address of the memory as a starting point; and
   start the allocation of work areas for other than resident programs with, as a starting point, an opposite side of the memory from said starting point being one of either the highest-level address and the lowest-level address.

* * * * *